(12) United States Patent
Li

(10) Patent No.: US 11,921,391 B2
(45) Date of Patent: Mar. 5, 2024

(54) DISPLAY PANEL AND DISPLAY DEVICE

(71) Applicant: Shenzhen China Star Optoelectronics Semiconductor Display Technology Co., Ltd., Guangdong (CN)

(72) Inventor: Zhan Li, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 539 days.

(21) Appl. No.: 17/051,320

(22) PCT Filed: Sep. 15, 2020

(86) PCT No.: PCT/CN2020/115202
§ 371 (c)(1),
(2) Date: Oct. 28, 2020

(87) PCT Pub. No.: WO2022/032786
PCT Pub. Date: Feb. 17, 2022

(65) Prior Publication Data
US 2023/0095623 A1    Mar. 30, 2023

(30) Foreign Application Priority Data
Aug. 10, 2020  (CN) .......................... 202010795956.0

(51) Int. Cl.
*G02F 1/1339* (2006.01)
*G02F 1/1335* (2006.01)
(Continued)

(52) U.S. Cl.
CPC ...... *G02F 1/1368* (2013.01); *G02F 1/134309* (2013.01); *G02F 1/13439* (2013.01);
(Continued)

(58) Field of Classification Search
CPC ............. G02F 1/1335; G02F 1/133512; G02F 1/133514; G02F 1/1336; G02F 1/1343;
(Continued)

(56) References Cited

U.S. PATENT DOCUMENTS

2006/0139553 A1* 6/2006 Kang .................. G02F 1/13394
349/149
2007/0058125 A1* 3/2007 Yoo ....................... G02F 1/1345
349/152

(Continued)

FOREIGN PATENT DOCUMENTS

CN           1549035       11/2004
CN         101398572        4/2009
(Continued)

OTHER PUBLICATIONS

Patent Translate CN 208999729.*

*Primary Examiner* — Thoi V Duong

(57) ABSTRACT

A display panel including a thin film transistor array substrate, a color filter substrate, a gold ball, a color resist bump, a first transparent electrode, and a second transparent electrode is provided. The first transparent electrode covers the color resist bump and is connected to the second transparent electrode at a top of the color resist bump. The display panel disclosed in the present invention improves stability of a common electrode signal by constructing a new electrode signal channel, and prevents a technical problem of horizontal crosstalk on the display panel.

8 Claims, 1 Drawing Sheet

(51) Int. Cl.
*G02F 1/1343* (2006.01)
*G02F 1/1362* (2006.01)
*G02F 1/1368* (2006.01)

(52) U.S. Cl.
CPC .. *G02F 1/136209* (2013.01); *G02F 1/136222* (2021.01); *G02F 1/133514* (2013.01); *G02F 1/1339* (2013.01); *G02F 1/13394* (2013.01); *G02F 1/13398* (2021.01)

(58) Field of Classification Search
CPC ........... G02F 1/13439; G02F 1/134309; G02F 1/1339; G02F 1/13392; G02F 1/13394; G02F 1/13398; G02F 1/1362; G02F 1/136209; G02F 1/136222; G02F 1/1368
See application file for complete search history.

(56) References Cited

U.S. PATENT DOCUMENTS

| | | | |
|---|---|---|---|
| 2008/0143902 A1 | 6/2008 | Ku | |
| 2014/0022478 A1 | 1/2014 | Kim et al. | |
| 2019/0113787 A1* | 4/2019 | Cao | ........................ G02F 1/1339 |

FOREIGN PATENT DOCUMENTS

| | | |
|---|---|---|
| CN | 102402044 | 4/2012 |
| CN | 104062816 | 9/2014 |
| CN | 109358459 | 2/2019 |
| CN | 208999729 | 8/2019 |
| CN | 209590482 | 11/2019 |
| CN | 209592038 | 11/2019 |

\* cited by examiner

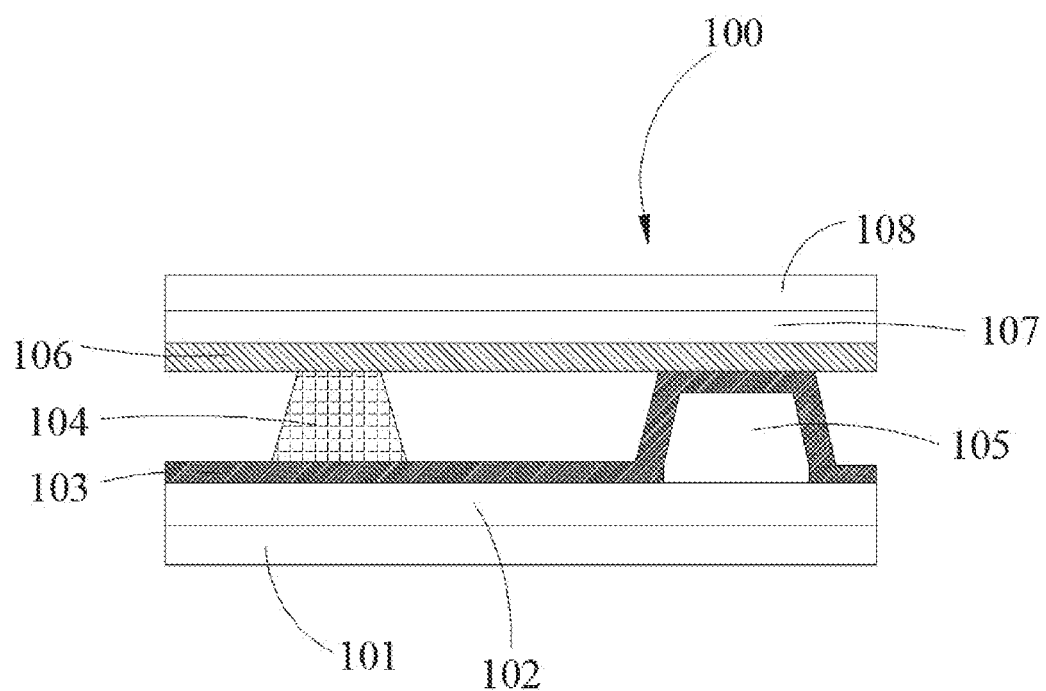

DISPLAY PANEL AND DISPLAY DEVICE

RELATED APPLICATIONS

This application is a National Phase of PCT Patent Application No. PCT/CN2020/115202 having International filing date of Sep. 15, 2020, which claims the benefit of priority of Chinese Patent Application No. 202010795956.0 filed on Aug. 10, 2020. The contents of the above applications are all incorporated by reference as if fully set forth herein in their entirety.

FIELD AND BACKGROUND OF THE INVENTION

The present invention relates to the field of display technologies, and in particular, to a display panel and a display device.

Liquid crystal displays (LCDs) are a type of widely used flat panel displays, and mainly realize picture display through liquid crystal switches to modulate an intensity of light field of backlights.

In current LCD panels, due to coupling capacitances between data lines and common electrodes of color filter substrates, when voltages of the data lines change, voltages of the common electrodes of the color filter substrates cannot recover quickly after the change, resulting in horizontal crosstalk on panels. With an increase in panel resolution, especially in panels with 8K resolution, the increase in resolution leads to a further reduction in scanning time of each scan line, recovery time of the voltages of the common electrodes of the color filter substrates is less, and horizontal crosstalk of the display panels is more serious.

In current LCD panels, due to coupling capacitances between data lines and common electrodes of color filter substrates, when voltages of the data lines change, voltages of the common electrodes of the color filter substrates cannot recover quickly after the change, resulting in horizontal crosstalk on panels.

SUMMARY OF THE INVENTION

Technical solutions provided by the present invention are as follows:

An embodiment of the present invention provides a display panel comprising a thin film transistor array substrate, a color filter substrate disposed opposite to the thin film transistor array substrate, and a gold ball and a color resist bump located between the thin film transistor array substrate and the color filter substrate;

a first transparent electrode is provided on a side of the thin film transistor array substrate opposite to the color filter substrate, and a second transparent electrode is provided on a side of the color filter substrate opposite to the thin film transistor array substrate; and the first transparent electrode covers the color resist bump and is connected to the second transparent electrode at a top of the color resist bump;

wherein the first transparent electrode and the second transparent electrode form a signal conduction channel of a common electrode at the top of the color resist bump, and a height of the gold ball is equal to a height of the color resist bump.

According to the display panel provided by the embodiment of the present invention, the display panel further comprises:

a first metal layer disposed on a side of the thin film transistor array substrate facing the color filter substrate;

the color resist bump is disposed above the first metal layer;

the first transparent electrode is disposed above the first metal layer, and the first transparent electrode covers the first metal layer and the color resist bump;

a black matrix is disposed a side of the color filter substrate facing the thin film transistor array substrate;

the second transparent electrode is disposed on the black matrix, and the second transparent electrode is connected to the first transparent electrode at the top of the color resist bump; and two ends of the gold ball are respectively connected to the first transparent electrode and the second transparent electrode.

According to the display panel provided by the embodiment of the present invention, the color resist bump comprises at least one of a metal insulating layer, a passivation layer, a red pixel color resist, a green pixel color resist, or a blue pixel color resist.

According to the display panel provided by the embodiment of the present invention, the gold ball located between the thin film transistor array substrate and the color filter substrate connects the first transparent electrode and the second transparent electrode, and the gold ball is configured to transmit a common electrode signal of the first transparent electrode into the second transparent electrode.

According to the display panel provided by the embodiment of the present invention, the first transparent electrode and the second transparent electrode are connected at the top of the color resist bump to form a conduction path for the common electrode signal, and the common electrode signal of the first transparent electrode is directly transmitted into the second transparent electrode.

According to the display panel provided by the embodiment of the present invention, the gold ball is a conductive material comprising but not limited to gold, silver, and copper.

According to the display panel provided by the embodiment of the present invention, the first transparent electrode and the second transparent electrode are made of a same material comprising but not limited to indium tin oxide.

The embodiment of the present invention further provides a display panel comprising a thin film transistor array substrate, a color filter substrate disposed opposite to the thin film transistor array substrate, and a gold ball and a color resist bump located between the thin film transistor array substrate and the color filter substrate;

a first transparent electrode is provided on a side of the thin film transistor array substrate opposite to the color filter substrate, and a second transparent electrode is provided on a side of the color filter substrate opposite to the thin film transistor array substrate; and the first transparent electrode covers the color resist bump and is connected to the second transparent electrode at a top of the color resist bump.

According to the display panel provided by the embodiment of the present invention, the first transparent electrode and the second transparent electrode form a signal conduction channel of a common electrode at the top of the color resist bump.

According to the display panel provided by the embodiment of the present invention, a height of the gold ball is equal to a height of the color resist bump.

According to the display panel provided by the embodiment of the present invention, the display panel further comprises:
  a first metal layer disposed on a side of the thin film transistor array substrate facing the color filter substrate;
  the color resist bump is disposed above the first metal layer;
  the first transparent electrode is disposed above the first metal layer, and the first transparent electrode covers the first metal layer and the color resist bump;
  a black matrix is disposed a side of the color filter substrate facing the thin film transistor array substrate;
  the second transparent electrode is disposed on the black matrix, and the second transparent electrode is connected to the first transparent electrode at the top of the color resist bump; and
  two ends of the gold ball are respectively connected to the first transparent electrode and the second transparent electrode.

According to the display panel provided by the embodiment of the present invention, the color resist bump comprises at least one of a metal insulating layer, a passivation layer, a red pixel color resist, a green pixel color resist, or a blue pixel color resist.

According to the display panel provided by the embodiment of the present invention, the gold ball located between the thin film transistor array substrate and the color filter substrate connects the first transparent electrode and the second transparent electrode, and the gold ball is configured to transmit a common electrode signal of the first transparent electrode into the second transparent electrode.

According to the display panel provided by the embodiment of the present invention, the first transparent electrode and the second transparent electrode are connected at the top of the color resist bump to form a conduction path for the common electrode signal, and the common electrode signal of the first transparent electrode is directly transmitted into the second transparent electrode.

According to the display panel provided by the embodiment of the present invention, the gold ball is a conductive material comprising but not limited to gold, silver, and copper.

According to the display panel provided by the embodiment of the present invention, the first transparent electrode and the second transparent electrode are made of a same material comprising but not limited to indium tin oxide.

The embodiment of the present invention further provides a display device comprising a backlight module and a display panel located on the backlight module;
  wherein the display panel comprises a thin film transistor array substrate, a color filter substrate disposed opposite to the thin film transistor array substrate, and a gold ball and a color resist bump located between the thin film transistor array substrate and the color filter substrate;
  a first transparent electrode is provided on a side of the thin film transistor array substrate opposite to the color filter substrate, and a second transparent electrode is provided on a side of the color filter substrate opposite to the thin film transistor array substrate; and
  the first transparent electrode covers the color resist bump and is connected to the second transparent electrode at a top of the color resist bump.

According to the display device provided by the embodiment of the present invention, the first transparent electrode and the second transparent electrode form a signal conduction channel of a common electrode at the top of the color resist bump, the gold ball located between the thin film transistor array substrate and the color filter substrate connects the first transparent electrode and the second transparent electrode, and the gold ball is configured to transmit a common electrode signal of the first transparent electrode into the second transparent electrode.

According to the display device provided by the embodiment of the present invention, the color resist bump comprises at least one of a metal insulating layer, a passivation layer, a red pixel color resist, a green pixel color resist, or a blue pixel color resist.

According to the display device provided by the embodiment of the present invention, a height of the gold ball is equal to a height of the color resist bump.

In a display panel and a display device provided by an embodiment of the present invention, a color resist bump is disposed between a thin film transistor array substrate and a color filter substrate on the display panel, and a height of the color resist bump is set to match a height of a gold ball between the thin film transistor array substrate and the color filter substrate.

A first transparent electrode on a side of the thin film transistor array substrate completely covers the color resist bump. At a top of the color resist bump, the first transparent electrode is connected to a second transparent electrode. Two ends of the gold ball are respectively connected to the first transparent electrode and the second transparent electrode, and the gold ball is configured to transmit a common electrode signal of the first transparent electrode on a side of the thin film transistor array substrate into the second transparent electrode. The first transparent electrode and the second transparent electrode are connected on the color resist bump, which adds a conduction path of the common electrode signal to reduce resistance of a gold ball region, thereby improving stability of the common electrode signal, achieving an effect of improving the common electrode signal, and preventing technical problem of horizontal crosstalk on the display panel. Meanwhile, the display panel does not increase other manufacturing processes, and costs of products do not increase.

BRIEF DESCRIPTION OF THE SEVERAL VIEWS OF THE DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

FIG. 1 is a schematic structural view of a display panel provided by an embodiment of the present invention.

DESCRIPTION OF SPECIFIC EMBODIMENTS OF THE INVENTION

The following will clearly and completely describe the technical solutions in the embodiments of the present invention with reference to the drawings in the embodiments of the present invention. Obviously, the described embodiments are only a part of the embodiments of the present invention, rather than all the embodiments. Based on the embodiments in the present invention, all other embodiments obtained by those skilled in the art without creative work are within the protection scope of the present invention.

In the description of the present invention, it is to be understood that the terms "center," "longitudinal," "lateral," "length," "width," "thickness," "upper," "lower," "front," "rear," "left," "right," "vertical," "horizontal," "top," "bottom," "inner," "outer," "clockwise," "counterclockwise," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise.

In the description of the present invention, it is to be noted that, unless otherwise explicitly specified or limited, the terms "mounted," "connected," and "linked" are to be construed broadly, e.g., as meaning either a fixed connection, a removable connection, or an integral connection; may be mechanically connected, may be electrically connected or may be in communication with each other; either directly or indirectly through intervening media, either internally or in any other relationship. The specific meaning of the above terms in the present invention can be understood by those of ordinary skill in the art as appropriate.

In the present invention, unless otherwise specifically defined and defined, the first feature is "on" or "under" the second feature may include that the first feature is in direct contact to the second feature, and may also include that the first feature and the second feature are not in direct contact but through additional features between them. Moreover, the first feature is "on," "above," and "under" the second feature includes the first feature is directly above and obliquely above the second feature, or merely indicating that the high of the first feature is higher than the second feature. The first feature is "below," "under," and "lower" the second feature includes the first feature is directly below and obliquely below the second feature, or merely indicating that the high of the first feature is less than the second feature.

The following disclosure provides many different embodiments or examples for implementing different features of the invention. In order to simplify the disclosure of the present invention, specific example components and arrangements are described below. Of course, they are merely examples and are not intended to limit the present invention. Moreover, the present invention may repeat reference numerals and/or letters in the various examples, such repetition is for the purpose of simplicity and clarity and does not in itself dictate a relationship between the various embodiments and/or configurations discussed. In addition, examples of various specific processes and materials are provided herein, but one of ordinary skill in the art may recognize applications of other processes and/or uses of other materials.

In current LCD panels, due to coupling capacitances between data lines and common electrodes of color filter substrates, when voltages of the data lines change, voltages of the common electrodes of the color filter substrates cannot recover quickly after the change, resulting in horizontal crosstalk on panels. In order to solve the above technical problems, the present invention provides following technical solutions:

Please refer to FIG. 1, the present invention provides a display panel 100. The display panel 100 comprises a thin film transistor array substrate 101, a color filter substrate 108 disposed opposite to the thin film transistor array substrate 101, and a gold ball 104 and a color resist bump 105 located between the thin film transistor array substrate 101 and the color filter substrate 108.

A first transparent electrode 103 is provided on a side of the thin film transistor array substrate 101 opposite to the color filter substrate 108, and a second transparent electrode 106 is provided on a side of the color filter substrate 108 opposite to the thin film transistor array substrate 101.

The first transparent electrode 103 covers the color resist bump 105 and is connected to the second transparent electrode 106 at a top of the color resist bump 105. The first transparent electrode 103 and the second transparent electrode 106 form a signal conduction channel of a common electrode at the top of the color resist bump 105.

Specifically, the display panel 100 further comprises:
a first metal layer 102 disposed on a side of the thin film transistor array substrate 101 facing the color filter substrate 108;
the color resist bump 105 is disposed above the first metal layer 102;
the first transparent electrode 103 is disposed above the first metal layer 102, and the first transparent electrode 103 covers the first metal layer 102 and the color resist bump 105, for example, the first transparent electrode 103 completely covers the first metal layer 102 and the color resist bump 105;
a black matrix 107 is disposed a side of the color filter substrate 108 facing the thin film transistor array substrate 101;
the second transparent electrode 106 is disposed on the black matrix 107, and the second transparent electrode 106 is connected to the first transparent electrode 103 at the top of the color resist bump 105; and
two ends of the gold ball 104 are respectively connected to the first transparent electrode 103 and the second transparent electrode 106.

A height of the gold ball 104 is equal to a height of the color resist bump 105. The color resist bump 105 comprises at least one of a metal insulating layer, a passivation layer, a red pixel color resist, a green pixel color resist, or a blue pixel color resist. In the embodiment, the color resist bump 105 is composed of the red pixel color resist, the green pixel color resist, the blue pixel color resist, the metal insulating layer, and the passivation layer. In the embodiment, the color resist bump 105 can be replaced with other bumps that do not affect display of a panel, which is not specifically limited here. Other bumps or supports with other shapes that can connect the first transparent electrode 103 and the second transparent electrode 106 at the top are also within scopes of the technical solution of the embodiment.

In the embodiment, the thin film transistor array substrate 101 may be a conventional array substrate or a color filter on array (COA, a substrate with a color filter on an array) substrate, which is not specifically limited in the present invention. In the following embodiments, the present invention first uses the COA substrate as an example for description.

In the embodiment, the first transparent electrode 103 may also be referred to as a first common electrode layer or a pixel electrode layer for providing a common electrode signal. In the embodiment, a material of the first transparent electrode 103 may be indium tin oxide (ITO). The second transparent electrode 106 may also be referred to as a second common electrode layer, and a material of the second transparent electrode 106 may be ITO. In the embodiment, the gold ball 104 is a conductive material, comprising but not limited to conductive metals such as gold, silver, and copper. The gold ball 104 not only plays a role of conductively transmitting electrode signals, but also serves as a spacer layer of the display panel 100.

The gold ball 104 is connected to the first transparent electrode 103 and the second transparent electrode 106. The gold ball 104 is configured to transmit the common electrode signal of the first transparent electrode 103 into the second transparent electrode 106. Specifically, referring to FIG. 1, the gold ball 104 located between the thin film transistor array substrate 101 and the color filter substrate 108 connects the first transparent electrode 103 and the second transparent electrode 106. The gold ball 104 is configured to transmit the common electrode signal on the side of the thin film transistor array substrate 101 into the second transparent electrode 106 on the side of the color filter substrate 108 through the first transparent electrode 103. With the color resist bump 105 disposed close to the gold ball 104, the height of the color resist bump 105 is equal to the height of the gold ball 104. The first transparent electrode 103 covers the color resist bump 105. For example, the first transparent electrode 103 completely covers the color resist bump 105. The first transparent electrode 103 and the second transparent electrode 106 are connected at the top of the color resist bump 105 to form a conduction path of the common electrode signal, which directly imports the common electrode signal of the first transparent electrode 103 into the second transparent electrode 106. By connecting the first transparent electrode 103 and the second transparent electrode 106 at the top of the color resist bump 105 to form the conduction path of the common electrode signal, resistance of the gold ball 104 can be effectively reduced, thereby improving stability of the common electrode signal, achieving an effect of improving the common electrode signal, and preventing the technical problem of the horizontal crosstalk on the display panel.

The embodiment of the present invention further provides a display device. The display device comprises a backlight module, and the above-mentioned display panel provided in the embodiment is located on the backlight module. A working principle of the display device in the embodiment is same or similar to a working principle of the above-mentioned display panel, and will not be repeated here.

In the display panel and the display device provided by the embodiment of the present invention, the color resist bump is disposed between the thin film transistor array substrate and the color filter substrate on the display panel, and the height of the color resist bump is set to match the height of the gold ball between the thin film transistor array substrate and the color filter substrate. The first transparent electrode on the side of the thin film transistor array substrate completely covers the color resist bump. At the top of the color resist bump, the first transparent electrode is connected to the second transparent electrode. The two ends of the gold ball are respectively connected to the first transparent electrode and the second transparent electrode, and the gold ball is configured to transmit the common electrode signal of the first transparent electrode on the side of the thin film transistor array substrate into the second transparent electrode. The first transparent electrode and the second transparent electrode are connected on the color resist bump, which adds the conduction path of the common electrode signal to reduce the resistance of the gold ball region, thereby improving the stability of the common electrode signal, achieving the effect of improving the common electrode signal, and preventing technical problem of the horizontal crosstalk on the display panel. Meanwhile, the display panel does not increase other manufacturing processes, and costs of products do not increase.

The above is a detailed introduction to the display panel and the display device provided by the embodiment of the present invention. The article uses specific examples to explain principles and implementation of the present invention. The descriptions of the above embodiments are only used to help understand technical solutions and core ideas of the present invention. Those of ordinary skill in the art should understand that they can still modify the technical solutions described in the foregoing embodiments, or equivalently replace some of the technical features. These modifications or replacements do not deviate the essence of the corresponding technical solutions from the scope of the technical solutions of the embodiments of the present invention.

What is claimed is:

1. A display panel, comprising:

a thin film transistor array substrate, a color filter substrate disposed opposite to the thin film transistor array substrate, a first metal layer disposed on a side of the thin film transistor array substrate facing the color filter substrate, a color resist bump disposed on the first metal layer, and a gold ball;

wherein a first transparent electrode is provided on a side of the first metal layer opposite to the color filter substrate, and a second transparent electrode is provided on a side of the color filter substrate opposite to the thin film transistor array substrate; and the first transparent electrode covers the color resist bump and is connected to the second transparent electrode at a top of the color resist bump; the first transparent electrode and the second transparent electrode form a signal conduction channel of a common electrode at the top of the color resist bump, and wherein the gold ball is disposed on the first transparent electrode; a top of the gold ball is connected with the second transparent electrode; and a height of the gold ball is equal to a height of the color resist bump.

2. The display panel as claimed in claim 1, wherein the display panel further comprises a black matrix is disposed a side of the color filter substrate facing the thin film transistor array substrate;

the second transparent electrode is disposed on the black matrix, and the second transparent electrode is connected to the first transparent electrode at the top of the color resist bump; and two ends of the gold ball are respectively connected to the first transparent electrode and the second transparent electrode.

3. The display panel as claimed in claim 2, wherein the gold ball is configured to transmit a common electrode signal of the first transparent electrode into the second transparent electrode.

4. The display panel as claimed in claim 3, wherein the first transparent electrode and the second transparent electrode are connected at the top of the color resist bump to form a conduction path for the common electrode signal, and the common electrode signal of the first transparent electrode is directly transmitted into the second transparent electrode.

5. The display panel as claimed in claim 1, wherein the gold ball is a conductive material comprising but not limited to gold, silver, and copper.

6. The display panel as claimed in claim 1, wherein the first transparent electrode and the second transparent electrode are made of a same material comprising but not limited to indium tin oxide.

7. A display device, comprising:
   a backlight module and a display panel located on the backlight module;
   wherein the display panel comprises a thin film transistor array substrate, a color filter substrate disposed opposite to the thin film transistor array substrate, a first metal layer disposed on a side of the thin film transistor array substrate facing the color filter substrate, a color resist bump disposed on the first metal layer, and a gold ball;
   a first transparent electrode is provided on a side of the first metal layer opposite to the color filter substrate, and a second transparent electrode is provided on a side of the color filter substrate opposite to the thin film transistor array substrate; and
   the first transparent electrode covers the color resist bump and is connected to the second transparent electrode at a top of the color resist bump; the first transparent electrode and the second transparent electrode form a signal conduction channel of a common electrode at the top of the color resist bump, and
   wherein the gold ball is disposed on the first transparent electrode; a top of the gold ball is connected with the second transparent electrode; and a height of the gold ball is equal to a height of the color resist bump.

8. The display device as claimed in claim 7, wherein the gold ball is configured to transmit a common electrode signal of the first transparent electrode into the second transparent electrode.

* * * * *